(12) United States Patent
Redon

(10) Patent No.: US 7,596,991 B2
(45) Date of Patent: Oct. 6, 2009

(54) MULTIPLE PATH AIR MASS FLOW SENSOR ASSEMBLY

(75) Inventor: Fabien G. Redon, Southfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 123 days.

(21) Appl. No.: 11/769,931

(22) Filed: Jun. 28, 2007

(65) Prior Publication Data

US 2009/0000389 A1    Jan. 1, 2009

(51) Int. Cl.
*G01M 19/00*    (2006.01)
(52) U.S. Cl. .................... 73/114.31; 73/114.32; 73/861
(58) Field of Classification Search . 73/114.31–114.34, 73/114.37, 202, 202.5, 203, 204.21, 861.52
See application file for complete search history.

(56) References Cited

U.S. PATENT DOCUMENTS

| | | | | |
|---|---|---|---|---|
| 5,307,667 A * | 5/1994 | Caron | ........................ | 73/1.26 |
| 5,714,683 A * | 2/1998 | Maloney | .................. | 73/114.33 |
| 6,109,249 A * | 8/2000 | Wild et al. | ............. | 123/568.21 |
| 6,247,462 B1 * | 6/2001 | Wild et al. | ............. | 123/568.21 |
| 6,352,065 B1 * | 3/2002 | Wild et al. | ................... | 123/494 |
| 6,459,984 B1 * | 10/2002 | Aono et al. | .................. | 701/102 |
| 6,539,785 B1 * | 4/2003 | Nagaishi | ................... | 73/114.79 |
| 6,886,399 B2 * | 5/2005 | Schnaibel et al. | ........ | 73/114.33 |
| 6,990,856 B2 * | 1/2006 | Dempsey et al. | ......... | 73/114.33 |
| 7,069,139 B2 * | 6/2006 | Muto et al. | .................... | 701/104 |
| 7,073,392 B2 * | 7/2006 | Lull et al. | ...................... | 73/861 |
| 7,099,767 B2 * | 8/2006 | Muto et al. | .................. | 701/102 |
| 7,159,453 B2 * | 1/2007 | Muto et al. | .............. | 73/114.34 |
| 7,174,777 B2 * | 2/2007 | Fischer et al. | ............ | 73/114.33 |
| 7,353,865 B2 * | 4/2008 | Speer | ......................... | 165/284 |
| 2004/0074311 A1 * | 4/2004 | Lull et al. | ...................... | 73/861 |

* cited by examiner

*Primary Examiner*—Lisa M Caputo
*Assistant Examiner*—Freddie Kirkland, III

(57) ABSTRACT

A multiple path air mass flow sensor assembly includes an inlet duct which is divided into at least two separate ducts. A first duct has an air mass flow sensor disposed in conventional fashion therein. A second duct includes a damper or valve which may be selectively, partially or fully opened. At low air flow rates, the damper is closed forcing all air through the first duct. As engine speed increases and the air mass flow rate increases, the damper opens, either fully at a predetermined flow rate or proportionally over a predetermined flow rate range, to allow a larger volume of air through the inlet duct. The signal from the air mass flow sensor is adjusted by the engine controller to compensate for the (bypass) air flowing through the second duct.

19 Claims, 2 Drawing Sheets

MULTIPLE PATH AIR MASS FLOW SENSOR ASSEMBLY

BACKGROUND OF THE INVENTION

1. Field of the Invention

The invention relates generally to air mass flow sensors and more particularly to a multiple path air mass flow sensor having improved measurement accuracy.

2. Description of the Prior Art

Modern internal combustion engines typically intended for use in passenger vehicles and trucks include extensive use of operational sensors and microprocessors to control engine operation, improve performance and fuel economy, and reduce emissions. In fact, the great improvements in these often conflicting operational parameters of the last several decades would simply not have been possible without the use of these systems.

One of the most commonly used sensors with an internal combustion engine and electronic controller is an air mass flow sensor. Typically, an air mass flow sensor includes a resistance element which is located in an air intake duct, often immediately after the air filter and before the duct is subdivided into the branches of the intake manifold or other structure. So disposed, the air mass flow sensor is exposed to the instantaneous flow of air to the engine. Data from the sensor is utilized by the engine controller to compute the instantaneous air mass flow which is utilized to, for example, adjust the air fuel mixture and optimize engine performance in accordance with predetermined parameters.

Ideally the air mass flow sensor will be located in an intake duct to ensure that the air impinging upon it is representative of the total air flow so that the output of the sensor accurately reflects the total instantaneous air mass flowing through the duct. This can be a challenge because the often convoluted duct and varying air velocities may create complex flow patterns which render accurate flow measurement difficult. This problem is especially acute at low flow rates which represent the most critical engine operating condition from the standpoints of emissions and fuel economy. Although reducing the size of the intake duct would seem to be a solution to this problem, since the size of the intake duct is mandated by the air flow requirements of the engine at full load, reducing its size at the sensor location to improve measurement accuracy reduces the volume of air provided to the engine, increases flow resistance and will thus interfere with achieving maximum engine power output. A larger intake duct, however, reduces the flow velocity and, as noted, renders air mass flow measurement more difficult, particularly under low flow conditions—precisely those conditions that are most critical to optimum engine operation.

The foregoing discussion suggests that improvements in the design of mass air flow sensor assemblies is desirable.

SUMMARY

A multiple path air mass flow sensor assembly for an internal combustion engine includes an intake duct which is divided into at least two separate ducts. A first duct has an air mass flow sensor disposed in conventional fashion therein. The second duct includes a damper or valve which may be selectively, partially or fully opened. At low air flow rates, the damper is closed forcing all air through the first duct. As engine speed increases and the air flow rate increases, the damper opens, either fully at a predetermined flow rate or proportionally over a predetermined range, to allow a larger volume of air through the intake duct. Processing of the signal from the air mass flow sensor by the engine controller or other processor is undertaken to compensate for the (bypass) air flowing through the second duct.

An air mass flow sensor assembly having a passive, spring biased damper is also disclosed. Here, the damper is opened by increased air flow and a sensor provides a signal indicating that the damper is open to the engine controller or other processor which recalculates the air mass flow based upon the open damper and the resulting bypass air flow.

The air mass flow sensor assembly according to the present invention exhibits improved measurement accuracy at low flow rates because the sensor is located in a duct smaller than those currently used with a comparable engine while providing reduced flow resistance and improved high volume air flow. Both parallel and non-parallel ducts defining parallel and non-parallel flow pathways as well as multiple, staged or sequenced bypass ducts and ducts having different areas or flow rates are also within the scope of this invention.

Thus it is an object of the present invention to provide an air mass flow sensor assembly having improved low flow rate measurement accuracy.

It is a further object of the present invention to provide an air mass flow sensor assembly having improved high flow rate capability.

It is a still further object of the present invention to provide an air mass flow sensor assembly having improved low flow rate measurement accuracy and high flow rate capacity.

It is a still further object of the present invention to provide an air mass flow sensor assembly having a damper disposed in a duct parallel to a duct containing the mass air flow sensor.

It is a still further object of the present invention to provide an air mass flow sensor assembly having a passive, spring biased damper and position sensor disposed in a duct parallel to a duct having a mass air flow sensor.

Further objects and advantages of the present invention will become apparent by reference to the following description and appended drawing wherein like reference numbers refer to the same component, element or feature.

DRAWINGS

DESCRIPTION OF THE PREFERRED EMBODIMENTS

Figure 1:
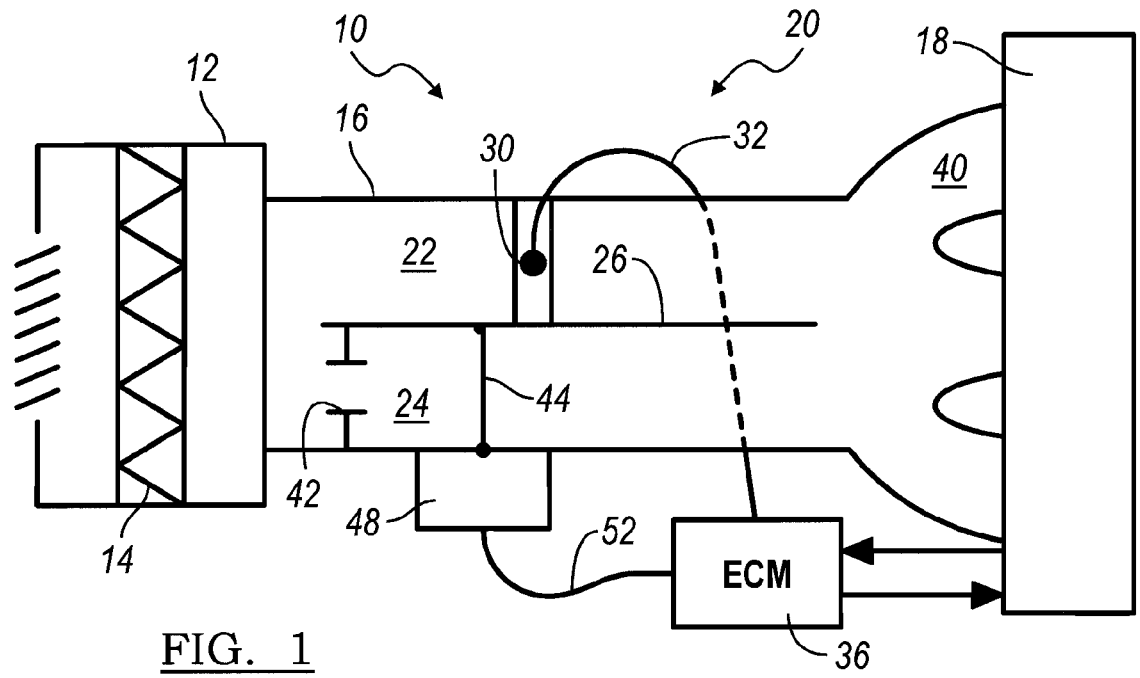
FIG. 1 is a diagrammatic view of a first embodiment of an air mass flow sensor assembly according to the present invention associated with an air intake system of an internal combustion engine.

Referring now to FIG. 1, an inlet or intake duct assembly for an internal combustion engine is illustrated and designated by the reference number 10. The intake duct assembly 10 includes an air filter assembly 12 which draws in ambient air and includes an air filtration element 14. The air filter assembly 12 communicates with an air inlet or intake duct 16 which provides combustion air to an internal combustion engine 18. In a first embodiment of an air mass flow sensor assembly 20 according to the present invention, the air inlet or intake duct 16 is separated into a first, sensing duct 22 and a second, bypass duct 24 by a divider or partition 26. While illustrated as parallel, it should be understood that the first, sensing duct 22 and the second, bypass duct 24 may be separate, non-parallel and sinuous or convoluted, for example, to fit within available under-hood space or match and connect to air inlet and engine components.

Disposed within the first, sensing duct 22 is a conventional air mass flow sensor 30. The air mass flow sensor 30 is configured and arranged to provide an accurate indication of the instantaneous air mass flow through the first, sensing duct 22. Typically, the air mass flow sensor 30 may include a resistive element such as a carbon or wirewound resistor. The air mass flow sensor 30 also includes an output conductor or cable 32 which carries the data signal from the air mass flow sensor 30 to a microprocessor such as an engine controller or engine control module 36. The intake duct 16 extends to and includes an exemplary intake manifold 40. Although not illustrated, the intake duct assembly 10 may also include a turbo-charger or supercharger, if desired.

Disposed within the second, bypass duct 24 is a calibrated orifice 42 having a known or defined area. The calibrated orifice 42 improves the accuracy of air mass flow computations undertaken by the engine control module 36 as will be more fully described below. The second, bypass duct 24 also includes a moveable damper, flap, partition or valve 44. The damper or valve 44 is sized to completely close off the second, bypass duct 24 when it is in its closed position, perpendicular or substantially perpendicular to the walls of the bypass duct 24 and the direction of air flow, as illustrated in FIG. 1. Thus, if the second, bypass duct 24 is square or rectangular in cross-section, for example, the damper or valve 44 is correspondingly shaped. About the periphery of the opening in the second, bypass duct 24 and adjacent the damper or valve 44 may be disposed a sealing lip, bead or flange 46 which assists in maintaining a tight seal between the damper or valve 44 and the walls of the second, bypass duct 22 when the damper or valve 44 is in its closed position, as illustrated in FIG. 1.

Figure 2:
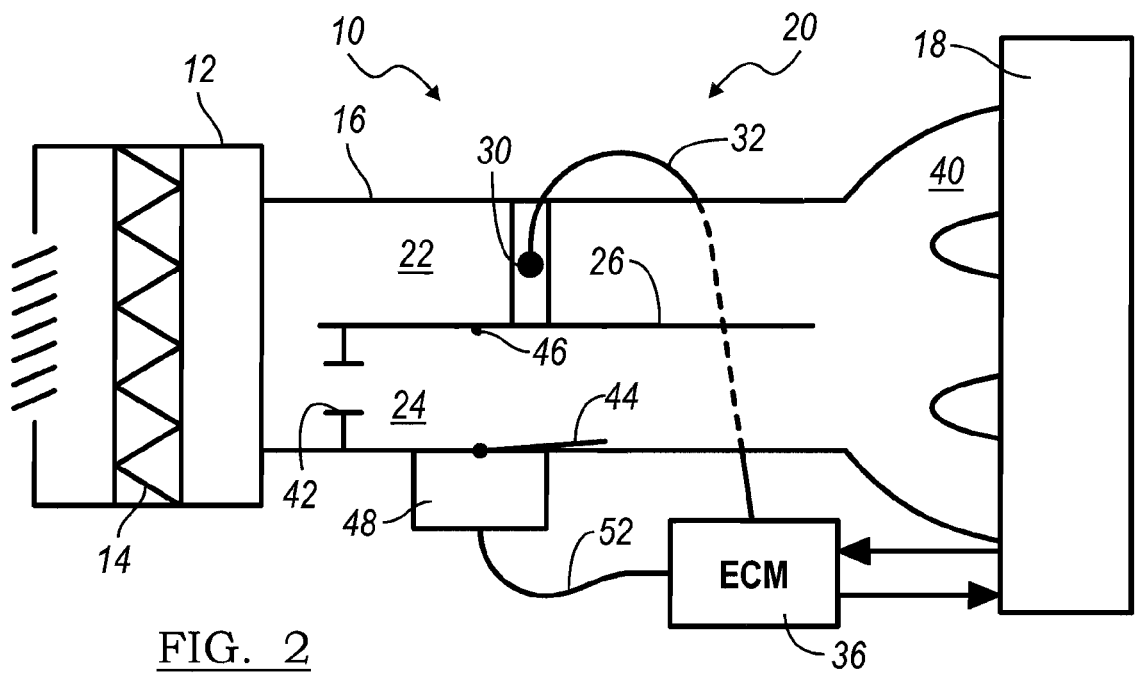
FIG. 2 is a diagrammatic view of the first embodiment of an air mass flow sensor assembly according to the present invention with the bypass damper open.

As illustrated in FIGS. 1 and 2, the damper or valve 44 is moved from its closed position, illustrated in FIG. 1, through intermediate positions, to a fully open position, illustrated in FIG. 2, by an electric, electronic or pneumatic actuator 48. The actuator 48 receives signals from the engine control module 36 through a conductor or cable 52 which command it to a fully closed, a fully open or an intermediate position.

Figure 3:
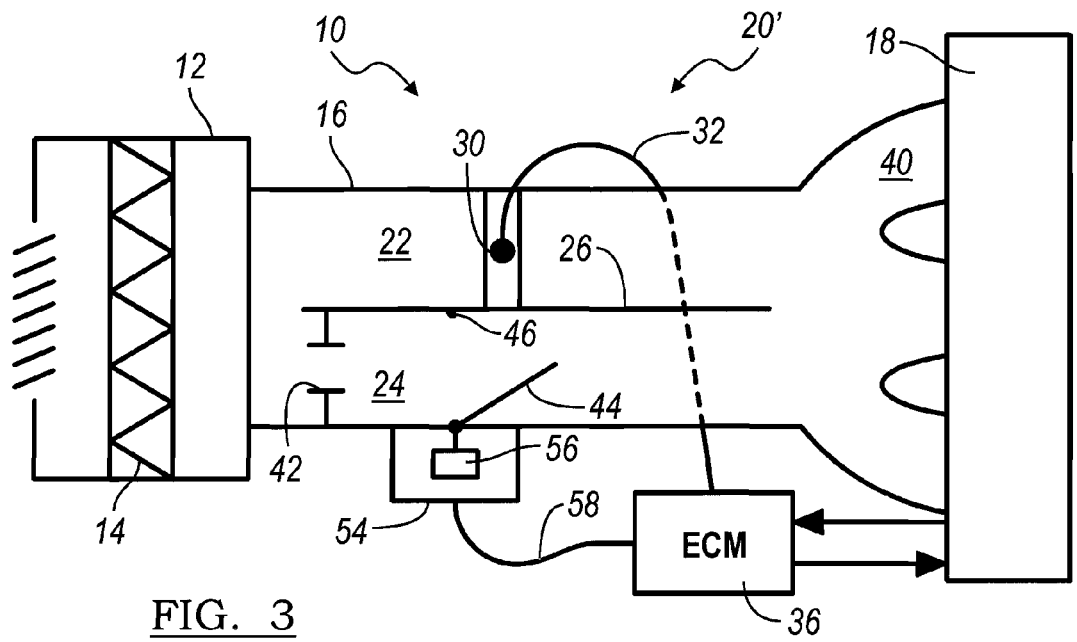
FIG. 3 is a diagrammatic view of another embodiment of an air mass flow sensor assembly according to the present invention.

FIG. 3 illustrates another embodiment 20' of the present invention wherein the majority of components are the same but the damper actuator 48 has been replaced by an assembly 54 having a two position switch or rotary transducer 56 which provides data regarding the position of the damper or valve 44 to the engine control module 36 through a conductor or cable 58. As indicated by the arrow, the assembly 54 includes a spring biasing feature which urges the damper or valve 44 toward the closed position, against the sealing bead or flange 46. As the volume of air in the intake duct 16 increases, pressure against the damper or valve 44 increases, overcoming the resistance of the spring and the damper or valve 44 moves toward an open position, as illustrated in FIG. 3. As the damper or valve 44 rotates and opens, the switch or transducer 56 changes state or provides a continuous signal indicating the position of the damper or valve 44 to the engine control module 36.

Figure 4:
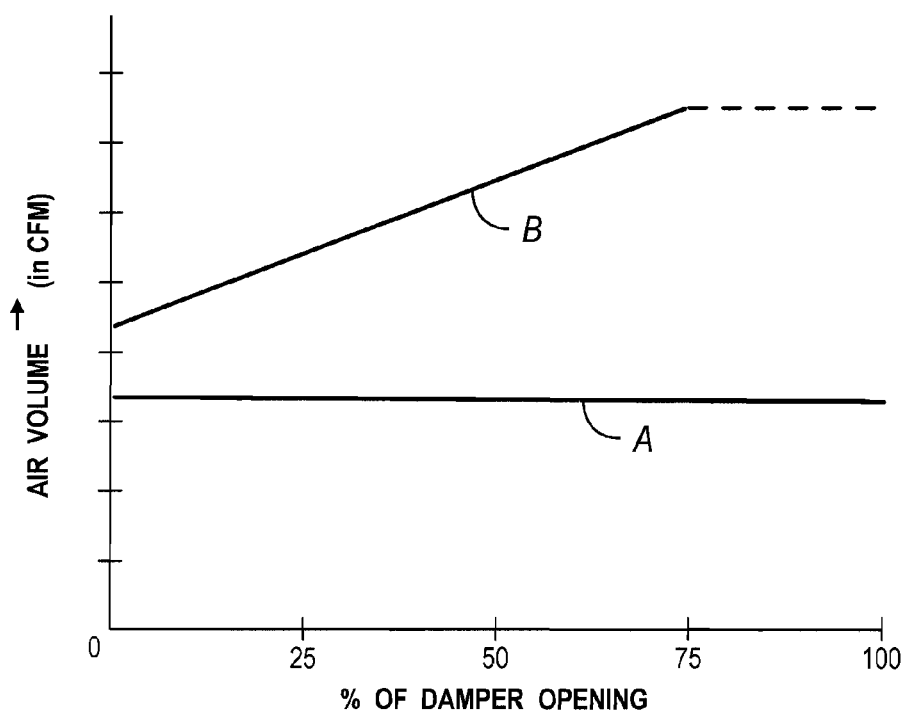
FIG. 4 is a graph presenting two relationships between air flow through an intake duct of an internal combustion engine and damper opening of an air mass flow sensor assembly according to the present invention.

FIG. 4 is a graph which presents two exemplary operating relationships between the total instantaneous air mass flow in the air intake duct 16 and the percent of opening of the damper or valve 44 relating to the embodiment of the invention illustrated in FIGS. 1 and 2. The lower line, designated "A," illustrates that operational mode in which the actuator 48 is commanded by the engine control module 36 to move the damper or valve 44 from its fully closed position to its fully opened position (without any intermediate position(s)) when air mass flow in the intake duct 16 reaches or exceeds a certain predetermined rate. Stated somewhat differently, when total instantaneous air mass flow is below the line "A," the damper or valve 44 will be closed; when it is above the line "A," the damper or valve 44 will be open. This threshold value may be determined by, for example, either the speed or acceleration of the internal combustion engine 18 or data from the air mass flow sensor 30.

A second line, "B," in FIG. 4 presents an alternative operational mode in which increased air mass flow, above a certain predetermined threshold, causes a corresponding or proportional opening of the damper or valve 44 as the air mass flow continues to increase. It will be appreciated that the proportional relationship between the air mass flow and the percent of opening of the damper or valve 44 a presented by line "B" while beginning at 0 percent, effectively is no longer proportional after the damper or valve 44 is significantly open. This is the result of a well understood feature of control dampers and valves whereby little or no proportional control of the controlled fluid is achieved after the valve or damper is about two-thirds open. It should, however, be appreciated that the 75 percent value is exemplary only and that this value may be higher or lower depending upon particular applications and operating conditions.

When the damper or valve 44 is partially or fully open, it is necessary that the engine control module 36 correct or recalibrate its computation of the instantaneous air mass flow through the air intake duct 16 (from its sensing and computations undertaken when the damper or valve 44 is fully closed) since all of the air passing through the intake duct 16 is no longer passing through the first, sensing duct 22. This correction or recalibration can be undertaken electronically in the engine control module 36 or, if the sensor assembly 10 is a stand alone device, within a self-contained microprocessor (not illustrated). In the case of operation according to line "A," the correction simply requires multiplying the sensed air mass flow by the inverse of the ratio of air passing through the first, sensing duct 22 and the intake duct 16 when the damper or valve 44 is fully open. In the case of operation according to line "B," the relationship between the percent of opening of the valve or damper 44 and the actual flow through the second, bypass duct 24 must first be known or established and this relationship utilized to make the necessary correction in accordance with the inverse ratio of sensed air mass flow and total air mass flow described immediately above.

With regard to the embodiment 20' of the invention illustrated in FIG. 3, similar operational considerations, particularly correcting or recalibrating the air mass flow value sensed by the air mass flow sensor 30 based upon the flow rate through the second, bypass duct 24, to reflect the actual total air mass flow must be undertaken, Here, however, the two position switch or transducer 56 provides data to the engine control module 36 regarding the present position of the damper or valve 44 resulting from the force of the moving air on the damper or valve 44. The engine control module 36 (or other processor) then computes the actual, instantaneous air mass flow passing through the inlet duct 16 in accordance with known relationships between the position of the damper or valve 44 and the air mass flow sensed by the air mass flow sensor 30 in the first, sensing duct 22.

While the foregoing description has centered upon an air mass flow sensor assembly 20 having two paths or ducts: a first main or sensing path or duct and a second auxiliary or bypass path or duct, it should be appreciated that the invention and its operating principles encompasses a multiple path air mass flow sensor having two, three, four or more bypass ducts in operational parallel with a single sensing duct. In any such multiple path or duct sensor assembly, the sensing duct is always open and one, two or more bypass ducts are opened in response to higher engine speeds and loads. As the bypass ducts are sequentially and cumulatively opened, the engine control module 36 or other controller corrects or recalibrates the output of the air mass flow sensor 30 to compensate for the reduced air mass flow through the sensing duct and increased flow through the bypass ducts. For example, if the assembly includes three equal flow rate ducts, i.e., one sensing duct and two bypass ducts, and all three ducts are open, the output of the air mass flow sensor would be tripled to compensate for the fact that it is sensing only one-third the total air mass flow passing through the inlet duct 16.

Additionally, it should be understood that while the foregoing description has centered upon an air mass flow sensor assembly 20 having two ducts of equal flow rates, an air mass flow sensor assembly having two or more ducts of known but unequal flow rates or areas is also within the scope of the present invention. For example, a main sensing duct 22 may have a flow rate or area of one unit whereas a bypass duct 24 and its calibrated orifice 42 may have a flow rate or area of two units or three units. When such a bypass duct 24 is opened, the engine control module 36 or other controller is programmed to and applies the appropriate ratio correction or recalibration to the output of the air mass flow sensor 30. If the main to bypass flow ratio is 1:2, so that only one-third of the total air mass flow is passing through the sensing duct 22 when the bypass duct is fully open, the engine control module 36 triples the sensed value of the air mass flow sensor 30; if the main to bypass flow ratio is 1:3, the engine control module 36 multiplies the sensed value by four when the bypass duct is fully open.

The foregoing description of the present invention is merely exemplary in nature and variations that do not depart from the gist of the invention are intended to be, and are, within the scope of the invention. Such variations are not to be regarded as a departure from the spirit and scope of the present invention.

What is claimed is:

1. An air mass flow sensor assembly comprising, in combination,
    an inlet duct having a first passageway and a second passageway, wherein the first passageway is in parallel relationship with the second passageway;
    an air mass flow sensor disposed in said first passageway,
    a damper disposed in said second passageway, and
    a controller for opening said damper at a predetermined air flow and correcting an air mass flow indication from said air mass flow sensor to compensate for air flow through said second passageway.

2. The air mass flow sensor assembly of claim 1 wherein said controller is a rotary actuator.

3. The air mass flow sensor assembly of claim 1 wherein said controller includes a spring.

4. The air mass flow sensor assembly of claim 1 wherein said controller includes a sensor for indicating a position of said damper.

5. The air mass flow sensor assembly of claim 1 further including an orifice plate located in said second passageway.

6. The air mass flow sensor assembly of claim 1 wherein said air mass flow sensor includes a resistance element.

7. The air mass flow sensor assembly of claim 1 further including a sealing lip in said second passageway adjacent said damper.

8. An improved air mass flow sensor assembly comprising, in combination,
    an air intake duct defining a first passageway and a second passageway, wherein the first passageway is in parallel relationship with the second passageway;
    an air mass flow sensor mounted in said first passageway;
    a damper mounted in said second passageway;
    an actuator for opening and closing said damper; and
    means for providing a signal indicating a position of said damper.

9. The improved air mass flow sensor of claim 8 wherein said intake duct includes a divider.

10. The improved air mass flow sensor of claim 8 wherein said actuator includes a spring.

11. The improved air mass flow sensor of claim 8 wherein said actuator is an electric motor.

12. The improved air mass flow sensor of claim 8 wherein said means for providing includes an engine control module.

13. The improved air mass flow sensor of claim 8 wherein said means for providing is a two position switch.

14. The improved air mass flow sensor of claim 8 further including an orifice plate disposed across said second passageway.

15. An air mass flow sensor assembly for an internal combustion engine comprising, in combination,
    an air intake duct defining a first, sensing duct portion and a second, bypass duct portion,
    an air mass flow sensor mounted in said first, sensing duct portion,
    a damper mounted in said second, bypass duct portion,
    an orifice plate disposed across said second, bypass duct portion upstream of said damper,
    a controller for opening and closing said damper, and
    means for providing a signal regarding a position of said damper.

16. The air mass flow sensor of claim 15 wherein said controller includes an actuator.

17. The air mass flow sensor of claim 15 wherein said controller includes a spring.

18. The air mass flow sensor of claim 15 wherein said means for providing is a transducer.

19. The air mass flow sensor of claim 18 wherein said transducer is a two position switch.

* * * * *